United States Patent
Yi (10) Patent No.: US 11,740,769 B2
(45) Date of Patent: Aug. 29, 2023

(54) SCREENSHOT METHOD AND TERMINAL DEVICE

(71) Applicant: VIVO MOBILE COMMUNICATION CO., LTD., Guangdong (CN)

(72) Inventor: Ning Yi, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/514,914

(22) Filed: Oct. 29, 2021

(65) Prior Publication Data

US 2022/0050565 A1 Feb. 17, 2022

Related U.S. Application Data

(63) Continuation of application No. PCT/CN2020/084782, filed on Apr. 14, 2020.

(30) Foreign Application Priority Data

Apr. 29, 2019 (CN) .......................... 201910354836.4

(51) Int. Cl.
*G06F 3/048* (2013.01)
*G06F 3/0484* (2022.01)
*G06F 3/0488* (2022.01)

(52) U.S. Cl.
CPC .......... *G06F 3/0484* (2013.01); *G06F 3/0488* (2013.01)

(58) Field of Classification Search
CPC ............................. G06F 40/106; G06F 3/0484
See application file for complete search history.

(56) References Cited

U.S. PATENT DOCUMENTS

| 10,078,434 B2 * | 9/2018 | Wu | G06F 9/451 |
| 10,248,799 B1 * | 4/2019 | Leavy | H04L 9/0822 |
| 10,824,327 B2 * | 11/2020 | Sun | G06F 3/04845 |
| 2010/0070842 A1 * | 3/2010 | Aymeloglu | G06F 40/166 715/255 |
| 2010/0093325 A1 * | 4/2010 | Jang | G06F 3/04883 455/414.2 |

(Continued)

FOREIGN PATENT DOCUMENTS

| CN | 105094617 A | 11/2015 |
| CN | 105761211 A | 7/2016 |

(Continued)

OTHER PUBLICATIONS

Pundulik et al., Magnifying Smartphone Screen Using Google Glass for Low-Vision Users,, 2017, IEEE, 10 pages.*

(Continued)

*Primary Examiner* — Linh K Pham
(74) *Attorney, Agent, or Firm* — IP & T GROUP LLP (57) ABSTRACT

A screenshot method includes: receiving a first input performed on a first display interface; obtaining a target long preview screenshot of the first display interface in response to the first input; receiving a second input performed on the target long preview screenshot; in response to the second input, obtaining a target screenshot of a second display interface, where the second display interface is a display sub-interface of the first display interface; and generating a long screenshot according to the target long preview screenshot and the target screenshot.

9 Claims, 7 Drawing Sheets

(56) References Cited

U.S. PATENT DOCUMENTS

| | | | |
|---|---|---|---|
| 2012/0054669 A1* | 3/2012 | Refuah | G06F 16/951 707/E17.084 |
| 2013/0073953 A1* | 3/2013 | Onyenobi | A61P 25/28 715/252 |
| 2014/0002389 A1* | 1/2014 | Kim | H04N 21/43615 345/1.3 |
| 2014/0136951 A1* | 5/2014 | Kumar | G06F 16/9574 715/234 |
| 2014/0136973 A1* | 5/2014 | Kumar | G06F 16/9574 715/274 |
| 2015/0007024 A1* | 1/2015 | Jeong | H04N 1/32363 715/277 |
| 2015/0199731 A1* | 7/2015 | Jevtic | G06Q 30/0243 705/14.73 |
| 2015/0278180 A1* | 10/2015 | Nicholas, Jr. | G06F 3/04883 715/230 |
| 2015/0281445 A1* | 10/2015 | Kumar | H04M 3/42221 379/88.01 |
| 2015/0347284 A1* | 12/2015 | Hey | G06F 11/3688 717/125 |
| 2016/0117810 A1* | 4/2016 | Berry | H04L 41/22 715/738 |
| 2016/0291846 A1* | 10/2016 | DeWeese | G06T 1/20 |
| 2016/0299988 A1* | 10/2016 | Pancharathi | G06F 40/123 |
| 2017/0034244 A1* | 2/2017 | Eschbach | H04L 67/06 |
| 2017/0102836 A1* | 4/2017 | Yoon | G06F 16/957 |
| 2017/0337168 A1* | 11/2017 | Kunze | H04L 67/01 |
| 2017/0371844 A1 | 12/2017 | Yao | |
| 2018/0349107 A1* | 12/2018 | Lundeen | G06F 8/34 |
| 2019/0164449 A1* | 5/2019 | Kems | G06V 10/751 |
| 2019/0278453 A1* | 9/2019 | Sun | G06F 3/04845 |
| 2019/0377476 A1* | 12/2019 | Wong | G06F 3/0486 |
| 2020/0073903 A1* | 3/2020 | Jain | G06F 40/117 |
| 2021/0064222 A1* | 3/2021 | Mo | G06F 3/04842 |
| 2021/0286491 A1* | 9/2021 | Duan | G06F 1/1626 |
| 2022/0382448 A1* | 12/2022 | Lu | G06F 3/0482 |

FOREIGN PATENT DOCUMENTS

| | | | | |
|---|---|---|---|---|
| CN | 105843494 A | | 8/2016 | |
| CN | 106484256 A | | 3/2017 | |
| CN | 106527892 A | | 3/2017 | |
| CN | 107145293 A | * | 9/2017 | G06F 3/0488 |
| CN | 107229402 A | | 10/2017 | |
| CN | 107977144 A | | 5/2018 | |
| CN | 108255391 A | | 7/2018 | |
| CN | 108829314 A | | 11/2018 | |
| CN | 109271081 A | * | 1/2019 | G06F 1/1626 |
| CN | 109271087 A | | 1/2019 | |
| CN | 109358791 A | | 2/2019 | |
| CN | 110109593 A | | 8/2019 | |

OTHER PUBLICATIONS

Authors et al., A smart method to capture a screenshot beyond the mobile screen frame, 2016, IP.com, 8 pages.*
International Search Report of International Application No. PCT/CN2020/084782 dated Jul. 6, 2020.
Written Opinion of The International Searching Authority of International Application No. PCT/CN2020/084782 dated Jul. 6, 2020.
First Office Action of Priority Application No. 201910354836.4 dated May 26, 2020.
Second Office Action of Priority Application No. 201910354836.4 dated Nov. 5, 2020.

* cited by examiner

SCREENSHOT METHOD AND TERMINAL DEVICE

CROSS-REFERENCE OF RELATED APPLICATIONS

This application is a Bypass Continuation Application of PCT/CN2020/084782, filed on Apr. 14, 2020, which claims priority to Chinese Patent Application No. 201910354836.4 filed on Apr. 29, 2019, which are incorporated herein by reference in their entireties.

TECHNICAL FIELD

The present disclosure relates to the field of communication technologies, and in particular, to a screenshot method and a terminal device.

BACKGROUND

Many terminal devices such as mobile phones have a long screenshot capturing function. The principle of long screenshot capturing is: screenshot is performed on a current interface, a list sliding operation is simulated to slide screen content, and then screenshot is performed after sliding. Then, content captured in the two screenshot operations is spliced together to form and store a complete image.

SUMMARY

The embodiments of the present disclosure provide a screenshot method and a terminal device.

According to a first aspect, some embodiments of this disclosure provide a screenshot method, applied to a terminal device. The method includes:

receiving a first input performed on a first display interface;

obtaining a target long preview screenshot of the first display interface in response to the first input;

receiving a second input performed on the target long preview screenshot;

in response to the second input, obtaining a target screenshot of a second display interface, where the second display interface is a display sub-interface of the first display interface; and generating a long screenshot according to the target long preview screenshot and the target screenshot.

According to a second aspect, some embodiments of the present disclosure further provide a terminal device, including:

a first receiving module, configured to receive a first input performed on a first display interface;

a first obtaining module, configured to: obtain a target long preview screenshot of the first display interface in response to the first input;

a second receiving module, configured to receive a second input performed on the target long preview screenshot;

a second obtaining module, configured to: in response to the second input, obtain a target screenshot of a second display interface, where the second display interface is a display sub-interface of the first display interface; and a generation module, configured to generate a long screenshot according to the target long preview screenshot and the target screenshot.

According to a third aspect, some embodiments of the present disclosure further provide a terminal device, including a memory, a processor, and a program stored in the memory and executable on the processor. The program, when executed by the processor, implements the steps of the foregoing screenshot method.

According to a fourth aspect, some embodiments of the present disclosure further provide a non-transitory computer-readable storage medium. The non-transitory computer-readable storage medium stores a computer program. The computer program, when executed by a processor, implements the steps of the foregoing screenshot method.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of the present disclosure shall fall within the protection scope of the present disclosure.

For a dialog in an interface, if screenshot is also performed on content in the dialog while a long screenshot capturing operation is performed on the interface, screenshot needs to be performed on the interface and the dialog separately, and then screenshots are sent separately.

Therefore, in the related method, it is inconvenient to send a screenshot of an interface and a screenshot of a sub-interface of the interface.

Figure 1:
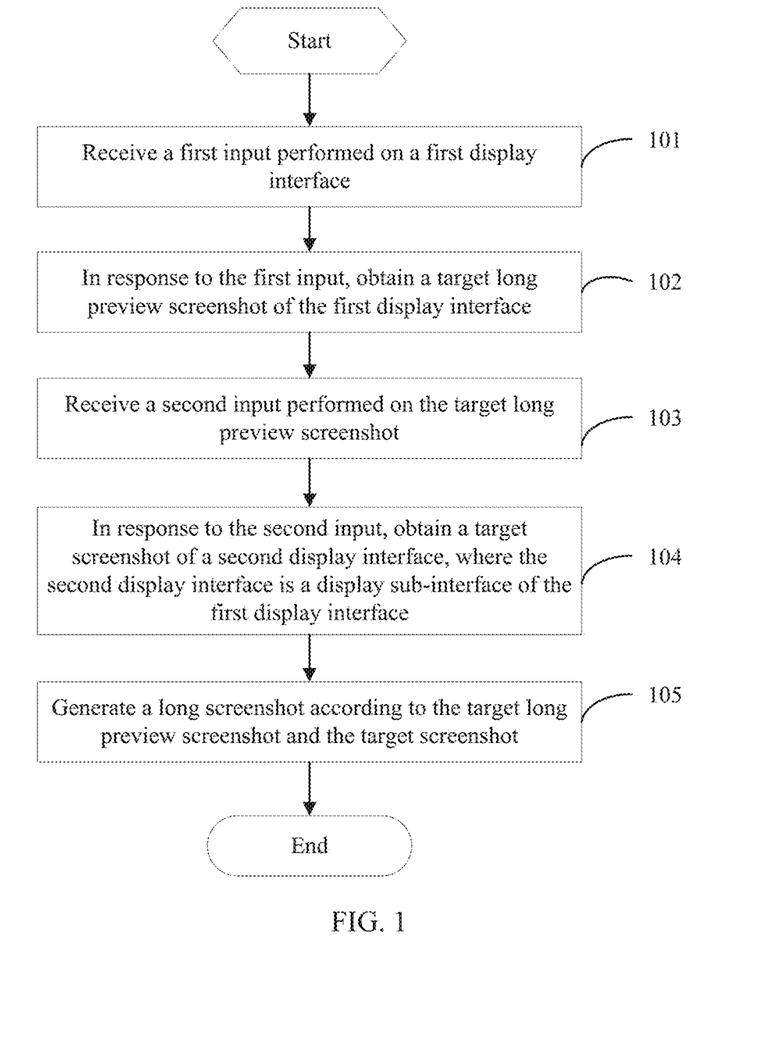
FIG. 1 is a first flowchart of a screenshot method according to some embodiments of the present disclosure.

Referring to FIG. 1, FIG. 1 is a flowchart of a screenshot method according to some embodiments of the present disclosure. As shown in FIG. 1, the method includes the following steps.

Step 101: Receive a first input performed on a first display interface.

The first input includes but is not limited to a key input, a touch input, and other inputs. The first display interface may be any display interface of the terminal device.

Step 102: Obtain a target long preview screenshot of the first display interface in response to the first input.

Optionally, in this step, a control in the first display interface is detected. Then, the target long preview screenshot is obtained in response to the first input, and according to a first position of the control in the first display interface, a second position corresponding to the control is marked in the target long preview screenshot.

The control may be understood as an entry that can provide users with operations, etc. For example, for a dialog in an interface, a control corresponding to the dialog may be clicked to expand content of the dialog. The corresponding first position of the control may be determined in the first display interface. Then, correspondingly, after long screenshot capturing is performed on the first display interface, the second position corresponding to the first position may also be marked in the obtained target long preview screenshot.

In actual applications, in response to the first input, a transparent mask interface covers the first display interface. The transparent mask interface displays a screenshot of the first display interface. When the user slides the display screen, in response to the user's operation, the display interface may be swiped to a next screen or a previous screen to perform screenshot, to generate a target long preview screenshot. At the same time, the background auxiliary service is started for control detection.

In some embodiments of the present disclosure, positions of all detected controls may be marked, or positions of some of the controls may be marked. At the same time, in some embodiments of the present disclosure, a marking form is not limited in any way. To facilitate a user to click, the mark may be provided with a color, or displayed in other highlighting ways.

Step 103: Receive a second input performed on the target long preview screenshot.

In this step, the second input is an input performed on a target position in the target long preview screenshot, the target position corresponds to one of the second positions, the second display interface is a display sub-interface corresponding to a target control in the first display interface, and the target control is a control corresponding to the target position. The second input may be a click input, a touch input, and so on.

Step 104: In response to the second input, obtain a target screenshot of a second display interface, where the second display interface is a display sub-interface of the first display interface.

When the second display interface is entered, a long screenshot capturing or screenshot operation may still be performed, and accordingly, a long screenshot or a screenshot is obtained. Herein, a long screenshot and a screenshot are collectively referred to as target screenshots.

Step 105: Generate a long screenshot according to the target long preview screenshot and the target screenshot.

In this step, in the target long preview screenshot, the insertion position of the target screenshot is determined. The target screenshot is inserted to the insertion position to obtain the long screenshot.

To ensure the continuity of the image, the insertion position is the target position. Alternatively, the insertion position is any position other than the target position in the target long preview screenshot.

In some embodiments of this disclosure, the screenshot method may be applied to a terminal device, for example, a mobile phone, a tablet computer, a laptop computer, a personal digital assistant (PDA), a mobile Internet device (MID), or a wearable device.

In some embodiments of the present disclosure, when long screenshot capturing is performed on the first display interface, a screenshot operation may be performed on the display sub-interface of the first display interface, to obtain the target screenshot. Then, the long screenshot is generated according to the target long preview screenshot of the first display interface and the target screenshot. Therefore, in the solutions in some embodiments of the present disclosure, screenshot is performed on the sub-interface of the display interface while long screenshot capturing is performed on the display interface, and the long screenshot is generated. Therefore, it is convenient to send screenshots of both the display interface and the sub-interface of the display interface.

Figure 2:
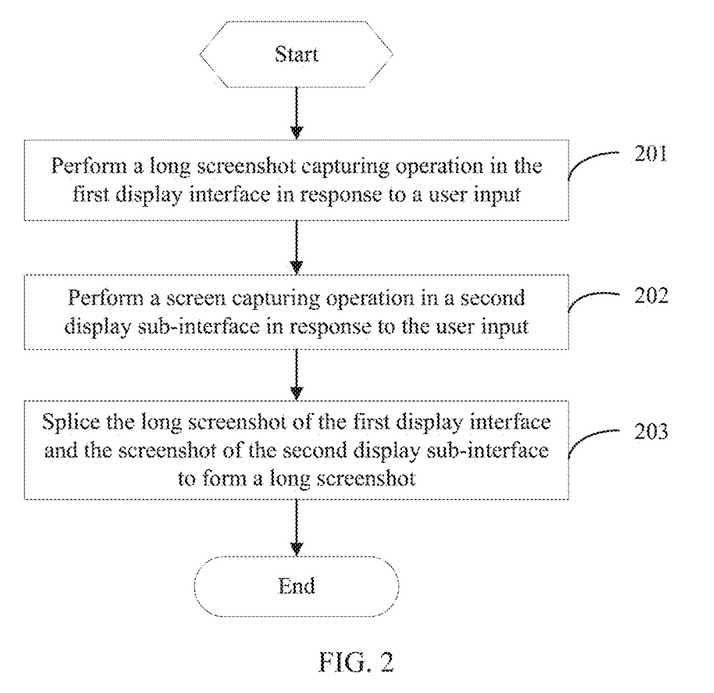
FIG. 2 is a second flowchart of a screenshot method according to some embodiments of the present disclosure.

FIG. 2 is a flowchart of a screenshot method according to some embodiments of the present disclosure. As shown in FIG. 2, the method includes the following steps.

Step 201: Perform a long screenshot capturing operation in the first display interface in response to a user input.

When the long screenshot capturing operation is performed in the first display interface, the background auxiliary service is started to perform control detection. In this case, a transparent mask interface covers the first display interface, that is, the long screenshot capture interface.

Figure 3:
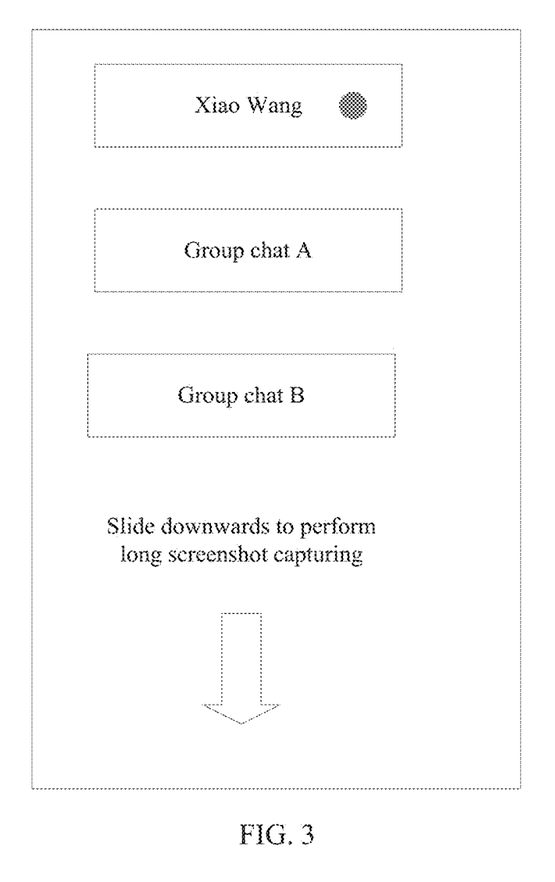
FIG. 3 is a first schematic diagram of a display interface according to some embodiments of the present disclosure.

When a control is detected in the current interface, a control in a list view list is obtained, and an end position of the control is marked on the mask according to the obtained position of the control in the first display interface, as shown in the FIG. 3.

When a sliding input of the user is received, in response to the user operation, interface content slides to perform screenshot on content of a next screen. After interface sliding stops, the auxiliary service is started to perform control detection again, a control in the list view list is obtained, and the end position of the control is marked on the mask according to the position of the control.

Step 202: Perform a screenshot operation in a second display sub-interface in response to the user input.

The marked control may continue to respond to a click event. When the user selects and clicks a marked control, long screenshot capture data of the current interface is buffered. If the list of the control is entered, the screenshot operation may be performed again.

The process of performing a long screenshot capturing operation in the second display sub-interface may be the same as that in step 201, so that when the second display sub-interface also has a display sub-interface, the display sub-interface of the second display sub-interface may be entered to perform the screenshot operation.

Figure 4:
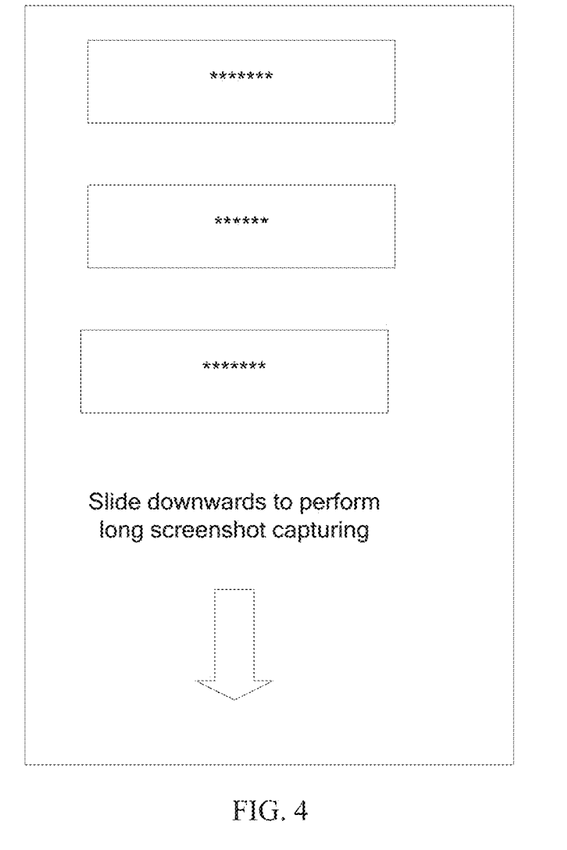
FIG. 4 is a second schematic diagram of a display interface according to some embodiments of the present disclosure.

Herein, it is assumed that the screenshot operation is performed in the second display sub-interface. Then, a screenshot of the second display sub-interface is obtained in this step, as shown in FIG. 4.

At this time, the screenshot of the second display sub-interface may be buffered. The name of the screenshot may be a position and control information (such as a control name) of the control in the first display interface.

Step 203: Splice the long screenshot of the first display interface and the screenshot of the second display sub-interface to form a long screenshot.

In the target long preview screenshot of the first display interface, the insertion position of the screenshot of the second display sub-interface is determined, that is, the position of the control in step 202 in the first display interface, and then, the screenshot of the second display sub-interface is inserted to the insertion position to obtain a long screenshot.

Figure 5:
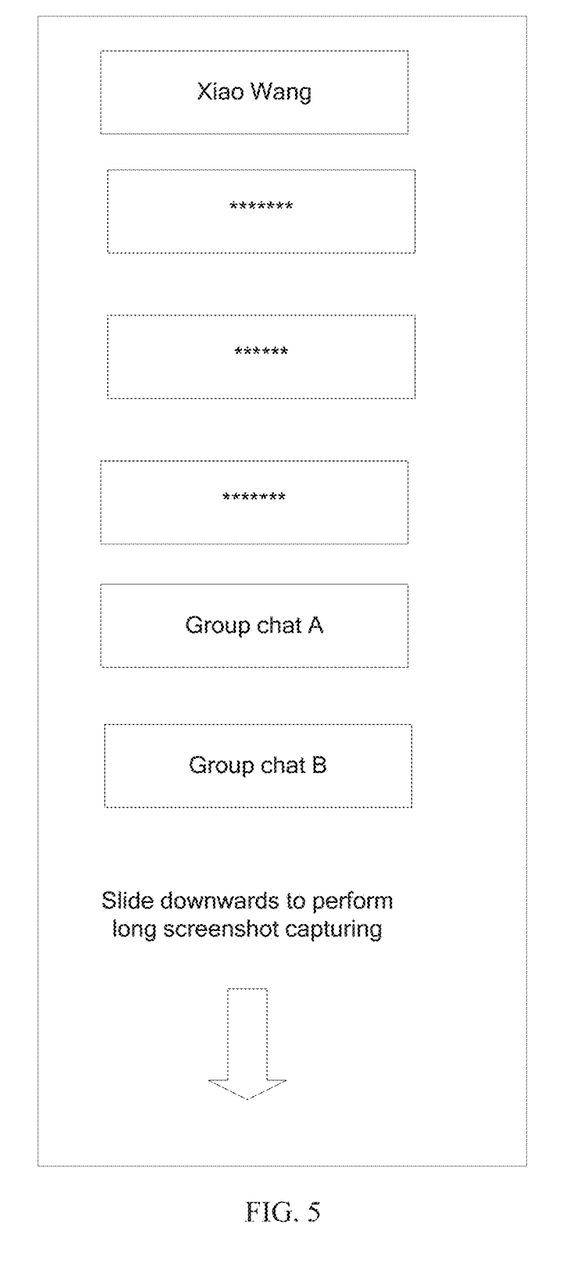
FIG. 5 is a third schematic diagram of a display interface according to some embodiments of the present disclosure.

FIG. 5 shows a spliced image of images obtained in step 202 and step 203.

In some embodiments of the present disclosure, firstly, control analysis is performed on screenshot content, a response event is reserved for the obtained control, and the position of the control responding to the click event is marked on the transparent mask. When the user clicks on the control, in response to the user click, the control is entered to continue the long screenshot capturing operation. When it is necessary to capture multiple chat records or multiple image lists at one time, this can be achieved by performing a long screenshot capturing operation on list information of the sub-view. Therefore, in the solutions in some embodiments of the present disclosure, screenshot is performed on the sub-interface of the display interface while long screenshot capturing is performed on the display interface. At the same time, the entire operation only generates one long screenshot file, which can ensure that sharing after long screenshot capturing is more convenient and faster.

Figure 6:
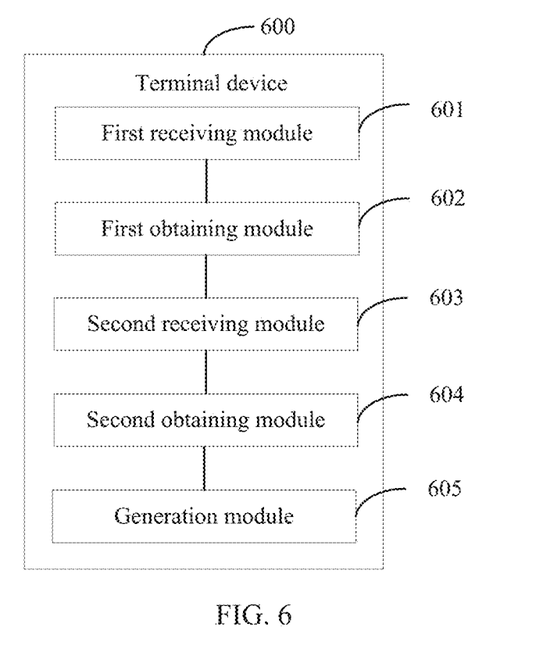
FIG. 6 is a first structural diagram of a terminal device according to some embodiments of the present disclosure.

Referring to FIG. 6, FIG. 6 is a structural diagram of a terminal device according to some embodiments of this disclosure. As shown in FIG. 6, the terminal device 600 includes:

a first receiving module 601, configured to receive a first input performed on a first display interface; a first obtaining module 602, configured to obtain a target long preview screenshot of the first display interface in response to the first input; a second receiving module 603, configured to receive a second input performed on the target long preview screenshot; a second obtaining module 604, configured to: in response to the second input, obtain a target screenshot of a second display interface, where the second display interface is a display sub-interface of the first display interface; and a generation module 605, configured to generate a long screenshot according to the target long preview screenshot and the target screenshot.

Optionally, the first obtaining module 602 includes: a detection submodule 6021, configured to detect a control in the first display interface; and an obtaining submodule 6022, configured to: obtain the target long preview screenshot in response to the first input, and according to a first position of the control in the first display interface, mark a second position corresponding to the control in the target long preview screenshot.

Optionally, the second input is an input performed on a target position in the target long preview screenshot, the target position corresponds to one of the second positions, the second display interface is a display sub-interface corresponding to a target control in the first display interface, and the target control is a control corresponding to the target position.

Optionally, the generation module 604 includes: a determining submodule 6041, configured to determine an insertion position of the target screenshot in the target long preview screenshot; and a generation submodule 6042, configured to insert the target screenshot to the insertion position to obtain the long screenshot.

Optionally, the insertion position is the target position, or the insertion position is any position other than the target position in the target long preview screenshot.

The terminal device 600 can implement each process implemented by the terminal device in the foregoing method embodiment. To avoid repetition, details are not described herein again.

In some embodiments of the present disclosure, when long screenshot capturing is performed on the first display interface, a screenshot operation may be performed on the display sub-interface of the first display interface, to obtain the target screenshot. Then, the long screenshot is generated according to the target long preview screenshot of the first display interface and the target screenshot. Therefore, in the solutions in some embodiments of the present disclosure, screenshot is performed on the sub-interface of the display interface while long screenshot capturing is performed on the display interface, and the long screenshot is generated. Therefore, it is convenient to send screenshots of both the display interface and the sub-interface of the display interface.

Figure 7:
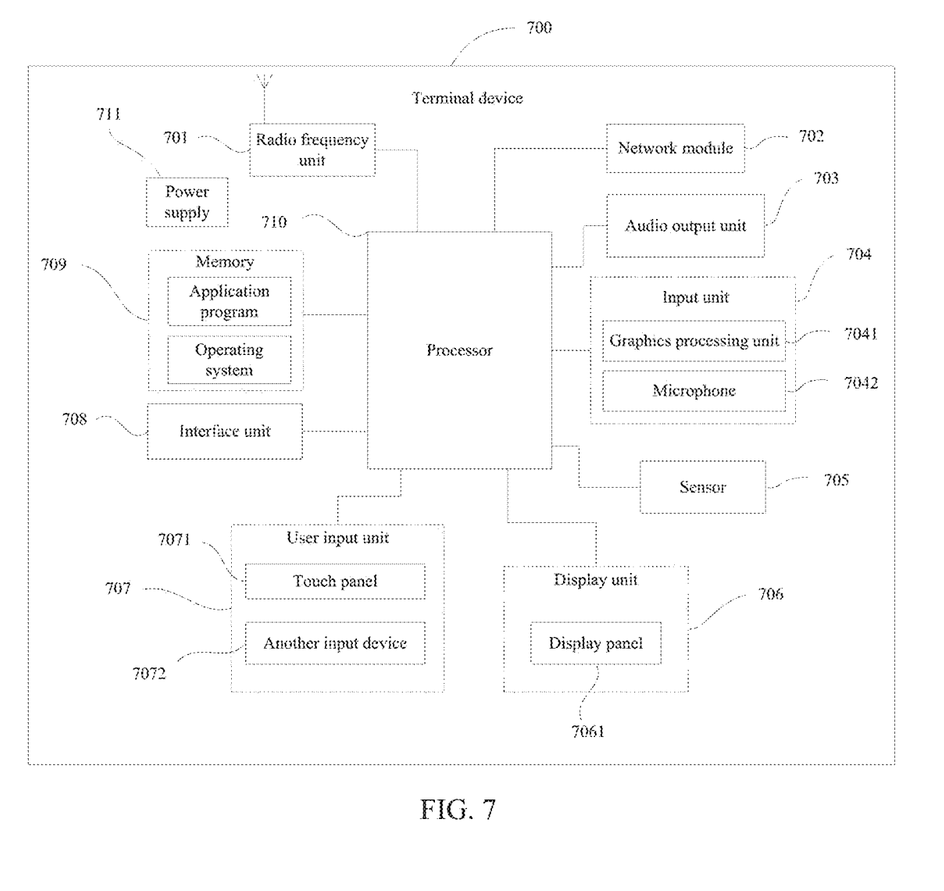
FIG. 7 is a second structural diagram of a terminal device according to some embodiments of the present disclosure.

FIG. 7 is a schematic diagram of a hardware structure of a terminal device implementing some embodiments of the present disclosure. The terminal device 700 includes, but not limited to: a radio frequency unit 701, a network module 702, an audio output unit 703, an input unit 704, a sensor 705, a display unit 706, a user input unit 707, an interface unit 708, a memory 709, a processor 710, a power supply 711, and the like. A person skilled in the art may understand that the structure of the terminal device shown in FIG. 7 does not constitute a limitation to the terminal device. The terminal device may include more or fewer components than that shown in the figure, or a combination of some components, or an arrangement of different components. In some embodiments of the present disclosure, the terminal device includes but is not limited to a mobile phone, a tablet computer, a notebook computer, a palmtop computer, an in-vehicle terminal, a wearable device, a pedometer, and the like.

The radio frequency unit 701 is configured to receive a first input performed on a first display interface.

The processor 710 is configured to obtain a target long preview screenshot of the first display interface in response to the first input.

The radio frequency unit 701 is configured to receive a second input performed on the target long preview screenshot.

The processor 710 is configured to: in response to the second input, obtain a target screenshot of a second display interface, where the second display interface is a display sub-interface of the first display interface; and generate a long screenshot according to the target long preview screenshot and the target screenshot.

In some embodiments of the present disclosure, when long screenshot capturing is performed on the first display interface, a screenshot operation may be performed on the display sub-interface of the first display interface, to obtain the target screenshot. Then, the long screenshot is generated according to the target long preview screenshot of the first display interface and the target screenshot. Therefore, in the solutions in some embodiments of the present disclosure, screenshot is performed on the sub-interface of the display interface while long screenshot capturing is performed on the display interface, and the long screenshot is generated. Therefore, it is convenient to send screenshots of both the display interface and the sub-interface of the display interface.

Optionally, the processor 710 is configured to: detect a control in the first display interface; and obtain the target long preview screenshot in response to the first input, and according to a first position of the control in the first display interface, mark a second position corresponding to the control in the target long preview screenshot.

Optionally, the second input is an input performed on a target position in the target long preview screenshot, the target position corresponds to one of the second positions, the second display interface is a display sub-interface corresponding to a target control in the first display interface, and the target control is a control corresponding to the target position.

Optionally, the processor 710 is configured to determine an insertion position of the target screenshot in the target long preview screenshot; and insert the target screenshot to the insertion position to obtain the long screenshot.

Optionally, the insertion position is the target position, or the insertion position is any position other than the target position in the target long preview screenshot.

It should be understood that, in some embodiments of the present disclosure, the radio frequency unit 701 may be configured to receive and send information or receive and send a signal in a call process. For example, after receiving downlink data from a base station, the radio frequency unit sends the downlink data to the processor 710 for processing. In addition, the radio frequency unit 701 sends uplink data to the base station. Usually, the radio frequency unit 701 includes but is not limited to an antenna, at least one amplifier, a transceiver, a coupler, a low noise amplifier, a duplexer, and the like. In addition, the radio frequency unit 701 may further communicate with another device by using a wireless communications system and network.

The terminal device provides a user with wireless broadband Internet access through the network module 702, for example, helps the user send and receive emails, browse web pages, and access streaming media.

The audio output unit 703 may convert audio data received by the radio frequency unit 701 or the network module 702 or stored in the memory 709 into an audio signal, and output the audio signal as sound. Moreover, the audio output unit 703 may also provide an audio output (such as a receiving sound of a calling signal, a message receiving sound and the like) related to a specific function executed by the terminal device 700. The audio output unit 703 includes a speaker, a buzzer, a telephone receiver, and the like.

The input unit 704 is configured to receive audio or video signals. The input unit 704 may include a graphics processing unit (GPU) 7041 and a microphone 7042. The graphics processing unit 7041 is configured to process image data of a static image or a video obtained by an image capture apparatus (for example, a camera) in a video capture mode or an image capture mode. A processed image frame may be displayed on the display unit 706. The image frame processed by the graphics processing unit 7041 can be stored in the memory 709 (or another storage medium) or sent via the radio frequency unit 701 or the network module 702. The microphone 7042 may receive a sound and can process such sound into audio data. The processed audio data may be converted, in a call mode, into a format that can be sent by the radio frequency unit 701 to a mobile communication base station for output.

The terminal device 700 further includes at least one sensor 705, such as a light sensor, a motion sensor and other sensors. The light sensor includes an ambient light sensor and a proximity sensor. The ambient light sensor may adjust luminance of a display panel 7061 based on brightness of ambient light. The proximity sensor may turn off the display panel 7061 and/or backlight when the terminal device 700 approaches an ear. As a type of the motion sensor, an accelerometer sensor may detect an acceleration in each direction (generally, three axes), and detect a value and a direction of gravity when the accelerometer sensor is static, and may be configured to identify a posture of the terminal device (such as screen switching between landscape and portrait modes, a related game, or magnetometer posture calibration), a function related to vibration identification (such as a pedometer or a knock), and the like. The sensor 705 may further include a fingerprint sensor, a pressure sensor, an iris sensor, a molecular sensor, a gyroscope, a barometer, a hygrometer, a thermometer, and an infrared sensor. Details are not described herein.

The display unit 706 is configured to display information input by a user or information provided to a user. The display unit 706 may include a display panel 7061, and the display panel 7061 may be configured in a form of liquid crystal display (LCD), organic light-emitting diode (OLED), or the like.

The user input unit 707 may be configured to receive input numeral or character information, and generate key signal input related to user setting and function control of the terminal device. The user input unit 707 includes a touch panel 7071 and another input device 7072. The touch panel 7071 is also referred to as a touchscreen, and may collect a touch operation performed by a user on or near the touch panel 7071 (such as an operation performed by a user on the touch panel 7071 or near the touch panel 7071 by using any proper object or accessory, such as a finger or a stylus). The touch panel 7071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 710, and can receive and execute a command sent by the processor 710. In addition, the touch panel 7071 may be implemented by using a plurality of types such as a resistive type, a capacitive type, an infrared ray, and a surface acoustic wave. The user input unit 707 may include another input device 7072 in addition to the touch panel 7071. The another input device 7072 may include but is not limited to one or more of a physical keyboard, a function key (such as a volume control key or an on/off key), a trackball, a mouse, a joystick, and the like. Details are not described herein again.

Optionally, the touch panel 7071 may cover the display panel 7061. After detecting the touch operation on or near the touch panel 7071, the touch panel 7071 transmits the touch operation to the processor 710 to determine a type of a touch event, and then the processor 710 provides corresponding visual output on the display panel 7061 based on the type of the touch event. Although in FIG. 7, the touch panel 7071 and the display panel 7061 are configured as two independent components to implement input and output functions of the terminal device, in some embodiments, the touch panel 7071 and the display panel 7061 can be integrated to implement the input and output functions of the terminal device. Details are not limited herein.

The interface unit 708 is an interface for connecting an external apparatus to the terminal device 700. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 708 may be configured to receive an input (for example, data information or power) from an external apparatus and transmit the received input to one or more elements in the terminal device 700, or transmit data between the terminal device 700 and the external apparatus.

The memory 709 may be configured to store a software program and various data. The memory 709 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 709 may include a high-speed random access memory, and further include a nonvolatile memory, for example, at least one disk storage device, a flash memory or other volatile solid storage devices.

The processor 710 is a control center of the terminal device, and various parts of whole terminal device are connected through various interfaces and circuits. Various functions and processing data of the terminal device are executed by running or executing a software program and/or a module stored in the memory 709 and calling data stored in the memory 709 so as to perform overall monitoring on the terminal device. The processor 710 may include one or more processing units. Optionally, the processor 710 may be integrated with an application processor and a modem processor. The application processor mainly processes an operating system, a user interface, an application program, and the like, and the modem processor mainly processes wireless communication. It may be understood that, alternatively, the modem processor may not be integrated into the processor 710.

The terminal device 700 may further include the power supply 711 (such as a battery) supplying power to each component. Preferably, the power supply 711 may be logically connected to the processor 710 by using a power management system, so as to implement functions such as charging management, discharging management and power consumption management by using the power management system.

In addition, the terminal device 700 includes some functional modules that are not shown. Details are not described herein.

Optionally, some embodiments of the present disclosure further provide a terminal device, including a processor 710, a memory 709, and a program that is stored in the memory 709 and that can run on the processor 710. When the program is executed by the processor 710, the processes of the embodiment of the screenshot method are implemented, and the same technical effects can be achieved. To avoid repetition, details are not described herein again.

Some embodiments of the present disclosure further provide a non-transitory computer-readable storage medium. The non-transitory computer-readable storage medium stores a computer program, and when the computer program is executed by a processor, the processes in the embodiment of the screenshot method are implemented, and a same technical effect can be achieved. To avoid repetition, details are not described herein again. The non-transitory computer-readable storage medium is, for example, a read-only memory (ROM), a random access memory (RAM), a magnetic disk, or an optical disc.

It can be understood that those embodiments described in the embodiments of the present disclosure can be implemented by hardware, software, firmware, middleware, microcode, or a combination thereof. For implementation with hardware, the module, unit, submodule, subunit, and the like may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal device (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing implementations. The foregoing implementations are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

What is claimed is:

1. A screenshot method, applied to a terminal device, comprising:
receiving a first input performed on a first display interface;
performing a long screenshot capturing operation on the first display interface to obtain a target long preview screenshot of the first display interface in response to the first input;
receiving a second input performed on the target long preview screenshot;
in response to the second input, performing a long screenshot capturing operation or a screenshot operation on a second display interface to obtain a target screenshot of the second display interface, wherein the second display interface is a display sub-interface corresponding to a target control in the first display interface; and
generating a long screenshot according to the target long preview screenshot and the target screenshot,
wherein the obtaining a target long preview screenshot of the first display interface in response to the first input comprises:
detecting a control in the first display interface; and
in response to the first input, obtaining the target long preview screenshot, and according to a first position of the control in the first display interface, marking a second position corresponding to the control in the target long preview screenshot; wherein the second input is an input performed on a target position, the target position corresponds to one of the second positions, and the target control is a control corresponding to the target position.

2. The method according to claim 1, wherein the generating a long screenshot according to the target long preview screenshot and the target screenshot comprises:

determining an insertion position of the target screenshot in the target long preview screenshot; and inserting the target screenshot to the insertion position to obtain the long screenshot.

3. The method according to claim 2, wherein the insertion position is the target position, or the insertion position is any position other than the target position in the target long preview screenshot.

4. A terminal device, comprising: a memory, a processor, and a program stored in the memory and executable on the processor, wherein the program, when executed by the processor, causes the terminal device to perform:

receiving a first input performed on a first display interface;

performing a long screenshot capturing operation on the first display interface to obtain a target long preview screenshot of the first display interface in response to the first input;

receiving a second input performed on the target long preview screenshot;

in response to the second input, performing a long screenshot capturing operation or a screenshot operation on a second display interface to obtain a target screenshot of the second display interface, wherein the second display interface is a display sub-interface corresponding to a target control in the first display interface; and generating a long screenshot according to the target long preview screenshot and the target screenshot, wherein the program, when executed by the processor, causes the terminal device to perform:

detecting a control in the first display interface; and in response to the first input, obtaining the target long preview screenshot, and according to a first position of the control in the first display interface, marking a second position corresponding to the control in the target long preview screenshot; wherein the second input is an input performed on a target position in the target long preview screenshot, the target position corresponds to one of the second positions, and the target control is a control corresponding to the target position.

5. The terminal device according to claim 4, wherein the program, when executed by the processor, causes the terminal device to perform:

determining an insertion position of the target screenshot in the target long preview screenshot; and inserting the target screenshot to the insertion position to obtain the long screenshot.

6. The terminal device according to claim 5, wherein the insertion position is the target position, or the insertion position is any position other than the target position in the target long preview screenshot.

7. A non-transitory computer-readable storage medium, wherein the non-transitory computer-readable storage medium stores a computer program, and the computer program, when executed by a processor, causes the processor to perform:

receiving a first input performed on a first display interface;

performing a long screenshot capturing operation on the first display interface to obtain a target long preview screenshot of the first display interface in response to the first input;

receiving a second input performed on the target long preview screenshot;

in response to the second input, performing a long screenshot capturing operation or a screenshot operation on a second display interface to obtain a target screenshot of the second display interface, wherein the second display interface is a display sub-interface corresponding to a target control in the first display interface; and generating a long screenshot according to the target long preview screenshot and the target screenshot, wherein the program, when executed by the processor, causes the terminal device to perform:

detecting a control in the first display interface; and in response to the first input, obtaining the target long preview screenshot, and according to a first position of the control in the first display interface, marking a second position corresponding to the control in the target long preview screenshot, wherein the second input is an input performed on a target position in the target long preview screenshot, the target position corresponds to one of the second positions, and the target control is a control corresponding to the target position.

8. The non-transitory computer-readable storage medium according to claim 7, wherein the program, when executed by the processor, causes the processor to perform:

determining an insertion position of the target screenshot in the target long preview screenshot; and inserting the target screenshot to the insertion position to obtain the long screenshot.

9. The non-transitory computer-readable storage medium according to claim 8, wherein the insertion position is the target position, or the insertion position is any position other than the target position in the target long preview screenshot.

* * * * *